United States Patent [19]
Miscovich

[11] 3,804,247
[45] Apr. 16, 1974

[54] METHOD AND APPARATUS FOR WASHING AND SIZING MATERIALS

[75] Inventor: John A. Miscovich, Orange, Calif.

[73] Assignee: Marcona Corporation, San Francisco, Calif.

[22] Filed: Oct. 27, 1972

[21] Appl. No.: 301,644

[52] U.S. Cl.................... 209/273, 209/5, 209/380
[51] Int. Cl............................................. B07b 1/04
[58] Field of Search......... 209/5, 17, 271, 273, 358, 209/380, 363; 241/5, 39, 40

[56] References Cited
UNITED STATES PATENTS

| | | | |
|---|---|---|---|
| 1,103,167 | 7/1914 | Wood | 209/273 |
| 2,913,114 | 11/1959 | Plaven | 209/273 |
| 2,992,740 | 7/1961 | Phippen | 209/17 X |
| 3,061,095 | 10/1962 | O'Malley | 209/380 X |
| 3,477,572 | 11/1969 | McKibben | 209/380 X |
| 3,501,002 | 3/1970 | Talley | 209/380 X |

Primary Examiner—Frank W. Lutter
Assistant Examiner—Ralph J. Hill

[57] ABSTRACT

Particulate material to be washed and sized is fed downwardly into the tank through the vertical perforated feed passageway and onto the perforated cone member and the surrounding perforated separator plate. Water under pressure discharged radially outwardly from the rotating nozzle mounted within the cone member and particulate material conveyed thereby is directed in a generally semi-circular path by the arcuate walls of the tank and impacts against the outer surface of the perforated passageway breaking up agglomerates of sticky clay containing mineral values and forcing water and small particles of material through the perforations in the passageway and back into the interior of the feed passageway. Small, sized particles pass downwardly through the perforations in the separator plate and cone member and into a sump while large particles which cannot pass through the perforations collect on the floor of the tank outwardly of the separator plate.

16 Claims, 1 Drawing Figure

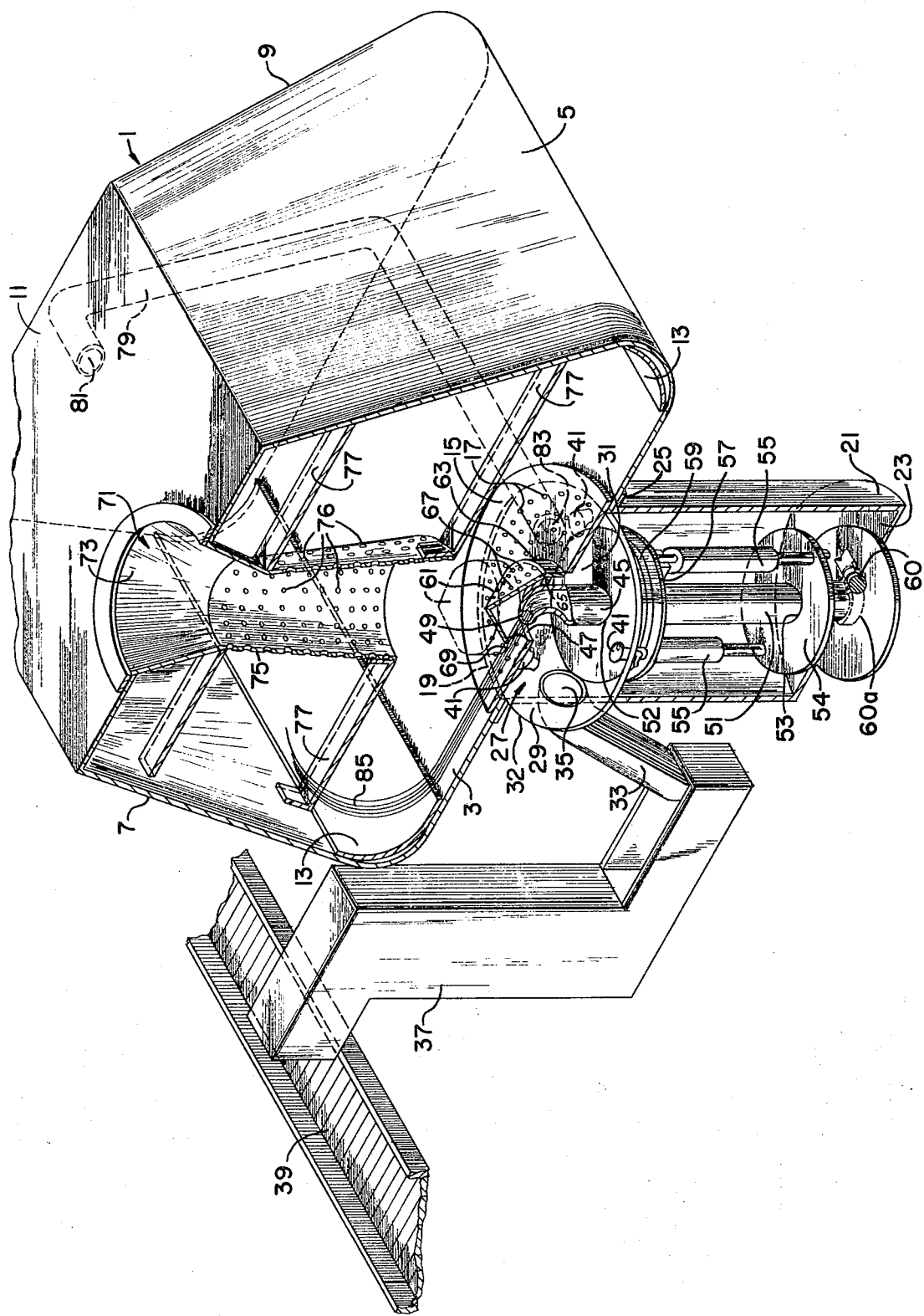

METHOD AND APPARATUS FOR WASHING AND SIZING MATERIALS

This invention relates to the processing of earthen materials containing mineral values in order to separate large particles from small ones and to break up compacted agglomerates of mixed particles.

THE PRIOR ART

In the past, revolving screens, shaker screens and stationery plates have been used as a means to wash and size particulate material. In the case of the revolving screens such as are used in connection with bucket line dredges and gravel plants, the screen rotates and water jets are fixed at the discharge end of the screen and are directed so as to discharge into the material on the screen, or a pipe with a plurality of spaced apart jets is positioned inside of the screen so the water discharges into the material as the screen rotates. When the material is sticky, retard rings are used in the screens to hold back the clay. This arrangement slows processing of the material and production. In apparatus employing screens or plates for separating and classifying particulate material mixed with clay, the particles of clay of a size that will pass through the screens employed, carry mineral values with them and these values are often lost unless the particles of clay with mineral values therein are further processed. In some instances, the clay particles knit together into balls of clay and mineral values which pass over the recovery apparatus and carry the mineral values with them.

OBJECTS OF THE INVENTION

It is an object of this invention to provide an improved method and apparatus for breaking up balls of sticky clay type material containing mineral values and separating particles of the material according to size.

It is also an object of this invention to subject clay agglomerates containing mineral values to washing, agitation and recycling, and to recover small particles of minerals and clay.

Another object of the invention is to mix water and sized particles of treated material with untreated material passing to a treating zone.

An additional object of the invention is to provide a de-slime tank for breaking up agglomerates of clay containing mineral values and regulating the rate of discharge of material from the tank so that clay particles do not pass out of the tank until they are prepared for separation from the mineral values.

Another object of the invention is to wash and size particulate material in a tank car by treating the material either continuously or in batches.

A further object of the invention is to provide a tank type classifier for materials wherein the larger particles and stones retained in the tank may be readily removed therefrom.

These and other objects oand advantages of the invention will become more apparent from the following specification and claims when taken in conjunction with the single drawing which is a perspective view, partially broken away and partially in cross section, showing a preferred form of the invention.

The tank 1 for washing and sizing material and for desliming a slurry contained within the tank is preferably in the form of a railway tank car although the tank may be stationary and of any suitable shape, for example circular or cylindrical.

The tank 1 includes a bottom wall 3, side walls 5 and 7 extending upwardly and converging inwardly from the bottom wall 3 and end walls, one of which is designated by the reference numeral 9 and a top wall 11. Arcuate wear plates 13 are positioned at the junction of the side walls 5 and 7 and the bottom wall 3 and fixed in place by welding.

A circular, perforated, separator plate 15 having openings 17 of a suitable size extending therethrough, is fixed as by welding or suitable fasteners to the bottom wall 3 and over an opening 19 formed in the central portion of the bottom wall of the tank 1.

A cylindrically shaped housing 21 having a bottom wall 23 and a radially outwardly extending flange 25 at its upper end, is located below the opening 19 in the bottom wall 3 and is bolted to the lower surface of the bottom wall of the tank.

A sump chamber 27 which has a frusto-conical side wall 29 and a bottom wall 31 is mounted in the upper end of the housing 21 directly beneath the separator plate 15. The upper outer edge 32 of the side wall 29 is in engagement with the inner wall of the housing 21 and is sealed thereto so that material received in the sump chamber 27 will not flow into the housing 21.

The material in the sump chamber 27 is removed therefrom though a discharge line 33 provided with an inlet opening 35 located in the side wall 29 at the bottom edge thereof. A pump, not shown, connected with the discharge line 33 directs the separated material to apparatus, not shown, for separating mineral values from clay. However, when the interior of the tank is being cleaned out a divertor device, not shown, connected with the discharge line 33, directs residue such as coarse rock and the like retained in the tank to a bucket elevator 37 and a belt conveyer 39.

A plurality of flush jets 41 are mounted on the frusto-conical side wall 29 of the sump chamber 27 and are directed so as to discharge water over the side wall 29 and the bottom wall 31 for removing material from the sump chamber through the discharge line 33. The flush jets 41 are adapted to be connected within the housing 21 to a source of water under pressure.

A rotatable, high pressure jet 45 which is disposed vertically in the housing 21, extends upwardly through an opening 47 formed in the center of the separator plate 15 and terminates a short distance above the upper surface of the separator plate. The discharge opening 49 of the high pressure jet 45 is directed radially outwardly over the upper surface of the separator plate 15. The high pressure jet 45 includes a tubular portion 51 which passes in sealed relation through an opening 52 formed in the center of the bottom wall 31 of the sump chamber 27 and through an opening 53 provided in the center of a circular disc 54 fixedly secured in the lower portion of the housing 21.

The high pressure jet 45 is adapted to be moved vertically between a position where the discharge opening 49 is spaced only a short distance above the separator plate 15 and a position where the discharge opening will be spaced a substantial distance above the separator plate for flushing and cleaning the tank as will be more fully described below.

A pair of hydraulic cylinders 55 are connected at their lower end to the fixed circular disc 53 and at their upper end to a vertically movable circular support 57.

The tubular portion 51 of the jet 45 is rotatably connected with the circular support 57 by a combined radial and thrust bearing generally designated by the reference numeral 59 which is not shown in detail since the bearing per se forms no part of this invention. The bearing 59 rotatably supports the tubular portion 51 within the circular support 57 and also transmits the vertical thrust of the hydraulic cylinders 55 to the tubular portion 51 so that the jet 45 will be raised or lowered when the hydraulic cylinders 55 are actuated.

The high pressure jet 45 is rotated at the desired rate by a drive worm gear 60 in mesh with a pinion gear 60a fixed to the tubular portion 51 adjacent the lower end thereof. The worm gear 60 is mounted on the end of the drive shaft of a variable speed drive device, not shown.

In order to distribute material over the surface of the separator plate 15 and protect the high pressure jet 45, and cone 61 having a cylindrical skirt portion 63 depending from the lower edge thereof is fixedly secured to the upper end of the high pressure jet 45 for rotation therewith by support members 65. The skirt portion 63 is a close rotating fit in the opening 47 formed in the center of the separator plate 15. The cone 61 is provided with openings 67 of predetermined size for the passage of small particles of the material into the sump, and the skirt portion 63 is provided with a suitable opening 69 in alignment with the discharge opening 49 of the high pressure jet 45 for the passage therethrough of a stream of water under high pressure. The cone 61 and the high pressure jet 45 are adapted to be moved vertically by the hydraulic cyclinders 55 between the position shown in full lines and the position where only the cone is shown in phantom lines.

The material to be washed and sized is introduced into the tank 1 through a passageway generally designated by the reference numeral 71. The passageway includes a short, funnel-shaped portion 73 which is fixed at its upper edge to the top wall 11 of the tank 1 and an elongated, perforated, frusto-conical shaped portion 75 which extends downwardly and diverges outwardly from the lower edge of the funnel shaped portion 73. The lower end of the frusto-conical portion 75 of the passageway 71 terminates a substantial distance above the separator plate 15 and the axis of the passageway 71 is substantially in alignment with the axis of the cone 61. The lower end and the mid-portion of the passageway 71 are held in fixed position by brace members 77 connected between the passageway 71 and the side walls of the tank.

An overflow pipe 79 has an inlet opening 81 communicating with the upper portion of the interior of the tank and a discharge opening 83 connected to the sump chamber 27.

The openings or perforations 17 in the separator plate 15 and in the cone 61 are of a size predetermined to pass only particles of material suitable for further processing. The openings 76 in the frusto-conical portion 75 of the passageway 71 may be of the same size as those in the separator plate 15 and cone 61 or they may be a little larger so that particles of material and water may recycle through the openings 76 in the wall of the feed passage.

The material to be processed may be dry as it is fed into the tank or it may be wet with a predetermined amount of water. Additional water may be added to the tank at any time in order to control the density and the level of the slurry being processed.

In operation, particulate material to be washed and sized so that mineral values, such as gold, platinum, tin, cinnabar, phosphate, and other values such as kaolin, okre, may be recovered, if fed downwardly into the tank through the passageway 71 and falls onto the material distributer and separator cone 61 and onto the separator plate 15. Water from a source under high pressure is supplied to the lower end of the tubular portion 51 of the high pressure jet 45 and the jet 45 and cone 61 are rotated at a suitable speed by the drive gear 60. The high pressure stream of water flowing from the discharge opening 49 of the jet 45 impinges against the material resting on the upper surface of the separator plate 15 and conveys the material radially outwardly to the arcuate plates 13 where the water and particulate material are directed upwardly and inwardly in a generally semi-circular path indicated by the reference numeral 85 and impact against the outer surface of the perforated frusto-conical portion 75 of the passageway 71 forcing water and small particles of the particulate material through the perforations 76 and into the interior of the feed passageway where they will mix with and assist in the passage of material being introduced into the tank through the passageway 71. The violent action of the water acting at high velocity on the balls or lumps of clay mixed with mineral values scoures them and impacts them against each other as well as against the tank walls and the feed passageway thereby disintegrating the clay balls.

As the material is being processed in the tank, wet particles of the desired size will pass through the openings 17 in the separator plate 15 and those in the cone 61 and into the sump chamber 27, while particulate material which is too large to pass through the openings 17 in the separator plate 15 or through the openings 67 in the cone 61, fall to the floor of the tank radially outwardly of the separator plate 15. Water discharged from the flush jets 41 while material is being processed in the tank, aids the flow of material from the sump chamber 27 into the discharge line 33.

In the event that the level of the slurry in the tank reaches a predetermined level, the slimes on the surface of the slurry will overflow into the pipe 79 through the inlet opening 81 and will be discharged into the sump chamber 27 through the outlet opening 83.

When it is desired to flush out the tank 1, the hydraulic cylinders 55 are actuated to raise the cone 61 and the high pressure jet 45 to the elevated position with the discharge opening 49 of the jet positioned a substantial distance above the bottom wall 3 of the tank and with the lower edge of the skirt portion 63 of the cone disposed a substantial distance above the floor of the tank to provide a large passageway between the tank and the sump chamber. Water under high pressure is then discharged into the tank from the jet 45 and residue such as stones and other pieces of material which were too large to pass into the sump chamber 27 will be washed or flushed from the tank through the opening 47 and into the sump chamber 27 where water from the flush jets 41 will wash the residue into the discharge line 33.

While a preferred form of the invention has been disclosed and described herein, such changes and modifications as would occur to one skilled in the art to be

What I claim is:

1. A method of washing and sizing materials, comprising: feeding particulate granular material downwardly by gravity through a perforated passageway; distributing the material over the surface of a perforated separator plate; jetting a fluid radially outwardly over the surface of the separator plate and against material resting on the plate; directing the jetted fluid and the material subjected to the fluid jet through a generally semi-circular path which extends radially outwardly of the separator plate then curves upwardly and then curves radially inwardly and impacting the directed material against the outer wall of said perforated passageway thereby forcing fluid and particles of the directed material smaller than the size of the perforations in the passageway through the passageway perforations and into the interior of the passageway; permitting particles of the particulate material smaller than the openings in the separator plate to fall therethrough and into a sump; and permitting the particles of the material too large to pass through the perforations in the passageway and in the separator plate to fall and to collect radially outwardly of the separator plate.

2. A method according to claim 1 in which the fluid is a liquid.

3. A method according to claim 2 in which the liquid and the material impinged upon by the liquid forms a slurry having a surface layer of slimes, and including the step of removing the slimes from the surface of the slurry and conveying the slimes to said sump.

4. A method according to claim 1 in which the fluid is water.

5. A method according to claim 4 including the step of adding additional water to the directed material to form a slurry.

6. A method according to claim 5 including the step of removing slimes from the surface of the slurry and conveying the slimes to said sump.

7. A method according to claim 5 included the step of decanting slurry over the central portion of the separator plate through openings in a separator cone and directing it into said sump.

8. A method according to claim 1 wherein the fluid is jetted over the surface of the separator plate from a single jet, and including the step of rotating the jet and discharging the fluid radially in an annular path.

9. Apparatus for washing and sizing materials, comprising: a tank, having side walls converging upwardly from the bottom wall thereof, the junction between the bottom wall and the side walls forming a curved, arcuate surface; a perforated separator plate mounted in said bottom wall at the central portion thereof, an inverted cone member disposed at the central portion of said separator plate and extending upwardly from the upper surface thereof; a sump disposed below and in communication with said separator plate and cone member, a fluid jet nozzle mounted beneath said inverted cone member and having a discharge opening positioned within the cone member and above the surface of the separator plate, said discharge opening being directed radially outwardly over the surface of said separator plate through an opening in the wall of said cone member; means for connecting said nozzle to a source of fluid under pressure, a vertically extending, tubular, perforated feed passageway mounted above said separator plate and inverted cone, the axis of said passageway being substantially in alignment with the axis of said inverted cone, the lower discharge end of said passageway being spaced above the surface of said separator plate and inverted cone member.

10. Apparatus according to claim 9 including means fixedly attaching said cone member with said nozzle, and means for rotating said nozzle and cone member.

11. Apparatus according to claim 10 including means for moving said nozzle and cone member vertically to a position wherein the lower extremity of the cone member is disposed above the upper surface of the separator plate.

12. Apparatus according to claim 11 in which the wall of the sump is frusto-conical, and flush jet means having an opening directed toward the inner surface of the sump wall is mounted to discharge water there against.

13. Apparatus according to claim 11 including an overflow line for removing from slurry in the tank, said overflow line having an inlet opening in the upper portion of the tank and a discharge opening connected to said sump.

14. Apparatus according to claim 13 including means for discharging water into the tank in addition to that furnished by the jet nozzle.

15. Apparatus according to claim 9 in which the upper inlet end of said passageway is mounted in the top wall of the tank and at least a substantial portion of the length of said passageway is perforated and is of frusto-conical shape with the wall thereof diverging downwardly from the upper end thereof.

16. Apparatus according to claim 9 including means connected with the sump for draining it.

* * * * *